(12) United States Patent
Choi

(10) Patent No.: US 10,807,673 B2
(45) Date of Patent: Oct. 20, 2020

(54) BICYCLE FRAME

(71) Applicants: HYUNDAI MOTOR COMPANY, Seoul (KR); KIA MOTORS CORPORATION, Seoul (KR)

(72) Inventor: Jungnam Choi, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 223 days.

(21) Appl. No.: 16/171,543

(22) Filed: Oct. 26, 2018

(65) Prior Publication Data

US 2019/0185101 A1 Jun. 20, 2019

(30) Foreign Application Priority Data

Dec. 19, 2017 (KR) .......................... 10-2017-0175224

(51) Int. Cl.
| | |
|---|---|
| *B62K 19/36* | (2006.01) |
| *B62J 1/08* | (2006.01) |
| *B62K 3/02* | (2006.01) |
| *B62K 19/20* | (2006.01) |

(52) U.S. Cl.
CPC ................. *B62K 19/36* (2013.01); *B62J 1/08* (2013.01); *B62K 3/02* (2013.01); *B62K 19/20* (2013.01)

(58) Field of Classification Search
CPC ........ B62J 1/08; B62J 2001/085; B62J 19/36; B62K 3/02; B62K 19/20; B62K 19/36
See application file for complete search history.

(56) References Cited

U.S. PATENT DOCUMENTS

| | | | |
|---|---|---|---|
| 6,557,878 B2* | 5/2003 | Chen ........................ | B62J 1/08 280/226.1 |
| 7,258,358 B2 | 8/2007 | Fukui | |
| 9,464,650 B2* | 10/2016 | Lin ........................ | F16B 7/1418 |
| 9,981,707 B1* | 5/2018 | Chen ........................ | B62H 5/001 |
| 2008/0014015 A1* | 1/2008 | Brick ........................ | B62K 3/005 403/109.1 |
| 2008/0298886 A1* | 12/2008 | Chen ........................ | B62K 19/36 403/373 |
| 2011/0254246 A1* | 10/2011 | Pryde ........................ | B62K 19/36 280/287 |

FOREIGN PATENT DOCUMENTS

| | | |
|---|---|---|
| JP | 2007-137265 A | 6/2007 |
| KR | 20-0477077 | 4/2015 |

* cited by examiner

*Primary Examiner* — Kevin Hurley
(74) *Attorney, Agent, or Firm* — Brinks Gilson & Lione

(57) ABSTRACT

A frame of a bicycle includes: a seat tube having an enlarged portion formed in an upper part of the seat tube and connected with a main frame, a seat post movably disposed within the seat tube, a bicycle saddle mounted to an upper end of the seat post, and an adapter tube into which the seat post is inserted. In particular, the adapter tube includes a first clamp connected with the enlarged portion, a second clamp connected with the seat post, and a body connected with the first clamp and the second clamp.

16 Claims, 5 Drawing Sheets

BICYCLE FRAME

CROSS-REFERENCE TO RELATED APPLICATION

This application claims priority to and the benefit of Korean Patent Application No. 10-2017-0175224, filed on Dec. 19, 2017, the entire contents of which are incorporated herein by reference.

FIELD

The present disclosure relates to a bicycle frame. More particularly, the present disclosure relates to a bicycle frame of which a seat tube connected with a main frame is connected with a seat post.

BACKGROUND

The statements in this section merely provide background information related to the present disclosure and may not constitute prior art.

A bicycle, also called a cycle or bike, is a human-powered, pedal-driven, single-track vehicle, having two wheels attached to a frame, one behind the other.

Generally, height of a bicycle saddle may be adjusted according to a rider and the bicycle may have structures for maintaining the height of the bicycle saddle and for preventing from missing the bicycle saddle.

Also, the bicycle may have a structure for holding and fixing the bicycle saddle when a rider drives pedals.

A general bicycle frame has a main frame connected with a seat tube, a seat post connected with the seat tube and of which height is adjustable and a bicycle saddle is connected to an upper end of the seat post.

The seat tube and the seat post may be connected by a clamp unit and thus height of the bicycle saddle may be adjusted.

However, the main frame and the seat tube may be connected by welding, and thus back beads may be formed to an interior circumference of the seat tube.

We have discovered that since the back bead may interferes insertion of the seat post into the seat tube, an additional process for removing the back bead causes inconvenience.

For example, if the main frame and the seat tube are made of a steal material, the removing the back bead process may take time and cause a crack in the main frame and the seat tube.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide to a bicycle frame having an enlarged portion formed to an upper portion of a seat tube for accommodating back beads formed when a main frame and the seat tube are welded and thus a removing the back bead process is not required.

The present disclosure provides a bicycle frame provided with an adapter tube connecting the seat tube and a seat post, of which various seat posts may be applied.

In one form of the present disclosure, a bicycle frame may include: a seat tube having an enlarged portion formed in an upper part of the seat tube, where the enlarged portion is connected with a main frame; a seat post movably disposed within the seat tube; a bicycle saddle mounted to an upper end of the seat post; and an adapter tube into which the seat post is inserted. In particular, the adapter tube includes: a first clamp connected with the enlarged portion, a second clamp connected with the seat post, and a body connected with the first clamp and the second clamp.

The enlarged portion and the main frame may be connected to each other.

The seat post inserted into the adapter tube may contact an interior circumference of the seat tube.

An interior diameter of the first clamp may be greater than an exterior diameter of the enlarged portion, and an upper portion of the enlarged portion may support the body via the first clamp. In one form, the first clamp may cover an exterior circumference of the enlarged portion and the first clamp may include first protrusions bent from both ends of a slit formed in the first clamp.

The body may be integrated in an upper portion of the first clamp and supports the seat post.

A cut off portion may be formed in the body along a longitudinal direction of the body.

The second clamp may include second protrusions bent from both ends of the cut off portion.

An engage hole for engaging with a fastening member may be formed to each protrusion of the first protrusions and the second protrusions.

The first clamp, the second clamp and the body may be integrally formed.

The second clamp may include a fitting portion supported by an upper end of the body.

The second clamp may further include: an engaging portion covering an upper part of the body, second protrusions bent from both ends of the engaging portion, and an opening formed between the second protrusions.

An engage hole for engaging a fastening member may be formed in each protrusion of the first protrusions and the second protrusions.

The first clamp and the body may be integrally formed.

A receiving space may be formed between the enlarged portion and the seat post.

An exterior diameter of the body may be less than an interior diameter of the enlarged portion.

According to various exemplary forms of the present disclosure the bicycle frame has an enlarged portion formed to an upper portion of a seat tube for accommodating back beads formed when a main frame and the seat tube are welded and thus a removing the back bead process is not required.

Also, according to various exemplary forms of the present disclosure the bicycle frame provided with an adapter tube connecting the seat tube and a seat post, of which various seat posts may be applied.

The apparatuses of the present disclosure have other features and advantages which will be apparent from or are set forth in more detail in the accompanying drawings, which are incorporated herein, and the following Detailed Description, which together serve to explain certain principles of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
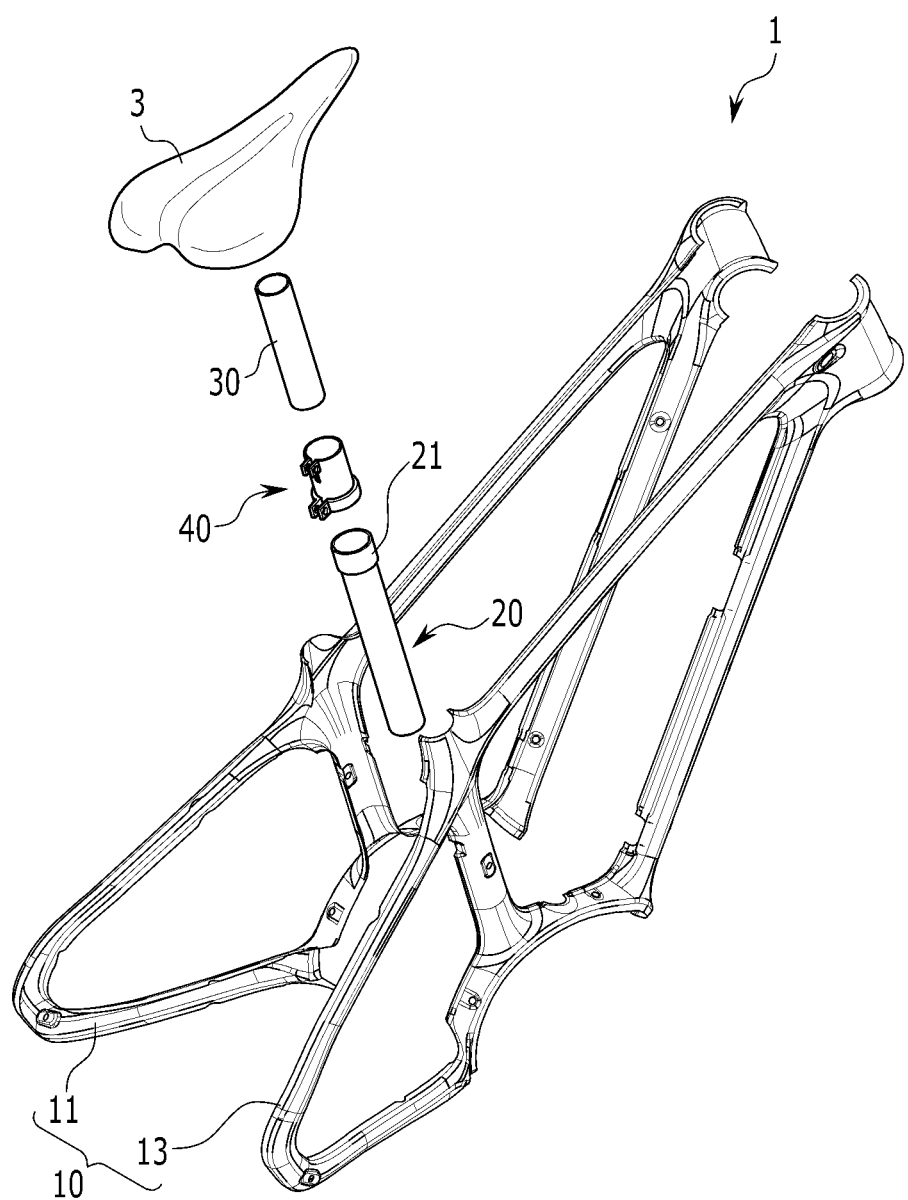
FIG. 1 is an exploded perspective view of a bicycle frame in a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

A part irrelevant to the description will be omitted to clearly describe the present disclosure, and the same or similar elements will be designated by the same reference numerals throughout the present disclosure.

In the following description, dividing names of components into first, second and the like is to divide the names because the names of the components are the same as each other and an order thereof is not particularly limited.

Figure 2:
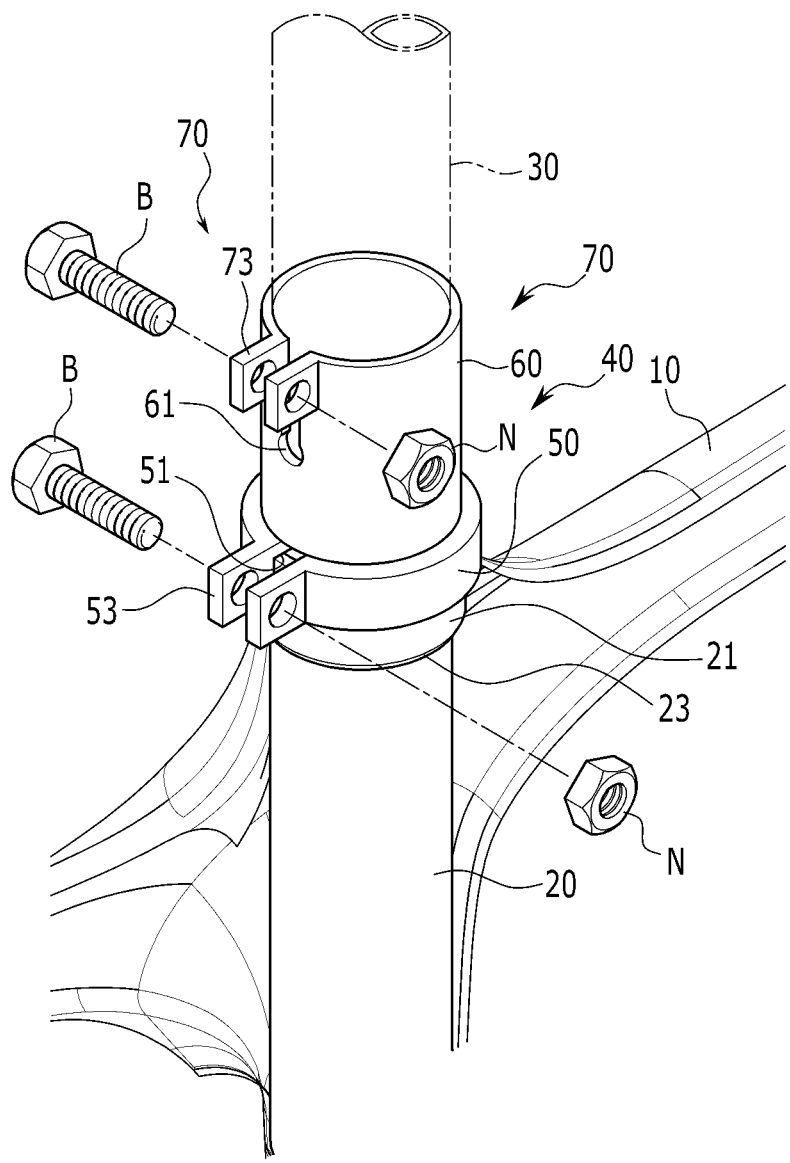
FIG. 2 is a partial perspective view of a bicycle frame according to the first exemplary form of the present disclosure.
Figure 3:
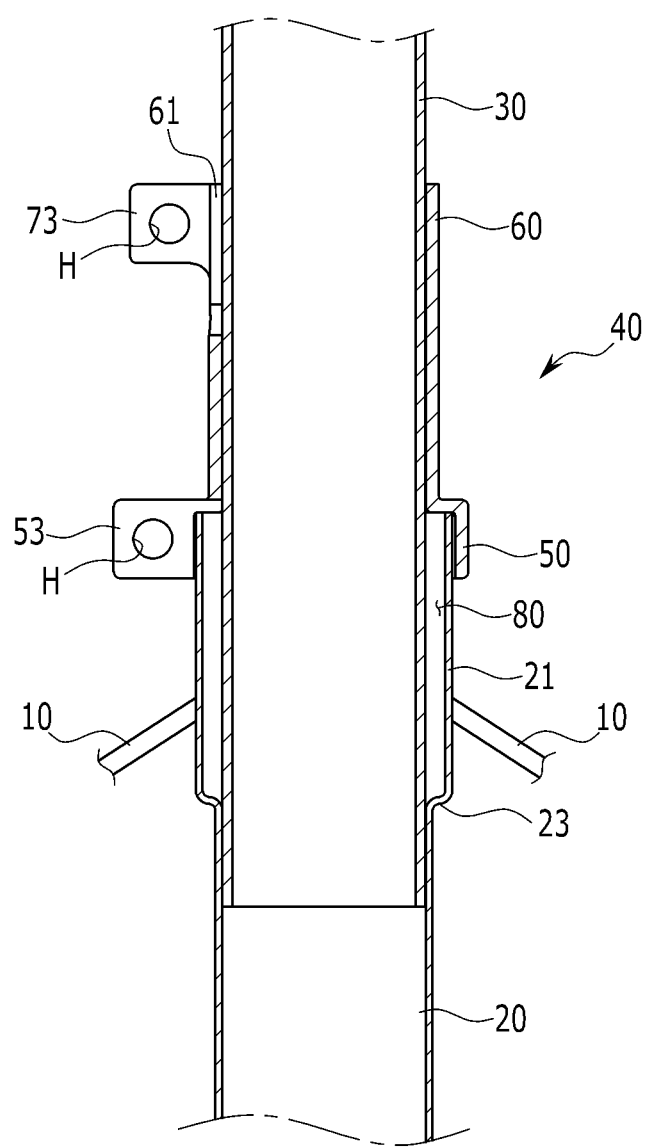
FIG. 3 is a cross-sectional view of a bicycle frame in the first exemplary form of the present disclosure.

FIG. 1 is an exploded perspective view of a bicycle frame in a first exemplary form of the present disclosure, FIG. 2 is a partial perspective view of a bicycle frame according to the first exemplary form of the present disclosure and FIG. 3 is a cross-sectional view of a bicycle frame according to the first exemplary form of the present disclosure.

Referring to FIG. 1 to FIG. 3, a bicycle frame includes a main frame 10, a seat tube 20, a seat post 30 and an adapter tube 40.

The main frame 10 may be made by welding a first frame 11 and a second frame 13, and in this case, arc welding may be applied.

A head tube may be formed to a front side of the main frame 10.

A steering shaft to which a handle is mounted is installed to the head tube, and a front wheel is installed by a fork configured at a lower side of the steering shaft.

A rear wheel is installed at a rear side of the main frame 10.

The seat tube 20 is connected to a middle portion of the main frame 10.

A pedal assembly may be formed under the seat tube 20.

The pedal assembly may be formed to protrude downward from the main frame 10, and a pedal, which is connected to the rear wheel by a chain, is installed on the pedal assembly.

The seat tube 20 assembled to the main frame 10 is disposed between the first frame 11 and the second frame 13 and welded.

The seat tube 20 may be a pipe and includes an enlarged portion 21 formed to an upper part thereof.

Also, the seat tube 20 includes a stepped surface 23 formed at a portion where diameter is changed due to the enlarged portion 21.

And the enlarged portion 21 of the seat tube 20 is connected to the main frame 10 by welding.

A lower portion of the seat post 30 is inserted into the seat tube 20.

A bicycle saddle 3 is mounted to an upper end of the seat post 30.

The seat post 30 inserted into the adapter tube 40 contacts an interior circumference of the seat tube 20.

Height of the bicycle saddle 3 may be adjusted by adjusting inserted length of the seat post 30 into the seat tube 20 and the adapter tube 40.

The adapter tube 40 includes a first clamp 50, a body 60 and a second clamp 70. The adapter tube 40 is mounted to on the seat tube 20. The adapter tube 40 is fixed to the seat tube 20 though the first clamp 50 and fixed to the seat post 30 through the second clamp 70.

The first clamp 50 has an interior diameter larger than an exterior diameter of the enlarged portion 21.

That is, the first clamp 50 is supported by an upper end of the enlarged portion 21 and covers an upper portion of the enlarged portion 21. A slit 51 is formed to a side of the first clamp 50.

And the first clamp 50 includes first protrusions 53 bent from both ends of the slit 51. An engage hole H is formed to the first protrusions 53. A fastening member B/N is mounted through the engage hole H. The fastening member may include a bolt B and a nut N.

The first protrusions 53 may be tightened by the fastening member B/N through the engage hole H and thus the first clamp 50 is fixed to the seat tube 20.

In one form, the body 60 is integrated in an upper portion of the first clamp 50 so that the body 60 is continuously extended upward from the upper portion of the first clamp 50 as shown in FIG. 3.

An exterior diameter of the body 60 is less than an interior diameter of the enlarged portion 21. That is, an upper end of the enlarged portion 21 may supports the body 60 through the first clamp 50.

A cut off portion 61 is formed to an upper portion of the body 60 along a longitudinal direction thereof.

The second clamp 70 includes second protrusions 73 bent from both ends of the cut off portion 61.

An engage hole H is formed to the second protrusions 73, and a fastening member B/N is mounted through the engage hole H. The fastening member may include a bolt B and a nut N.

The second protrusions 73 and the body 60 are integrally formed. The second protrusions 73 may be tightened by the fastening member B/N through the engage hole H and thus the second clamp 70 is fixed to the seat post 30.

According to the first exemplary form of the present disclosure, the seat tube 20, the seat post 30 and the adapter tube 40 of the bicycle frame may be connected through the first and the second clamps 50 and 70. The first clamp 50 integrally formed to the lower part of the adapter tube 40 corresponding to the enlarged portion 21 of the seat tube 20 may fix the seat tube 20 with the adapter tube 40 by fastening the fastening member B/N through the first protrusions 53. The second clamp 70 integrally formed to the upper part of the adapter tube 40 may fix the seat post 30 with the adapter tube 40 by fastening the fastening member B/N through the second protrusions 73.

Height of the bicycle saddle 3 may be adjusted by adjusting inserted length of the seat post 30 into the seat tube 20 and the adapter tube 40.

A receiving space 80 is formed between the enlarged portion 21 and the seat post 30. For example, if the main frame 10 is connected to the enlarged portion 21 by welding, back beads may be formed inner side of the enlarged portion 21. However, since the receiving space 80 is formed between the enlarged portion 21 and the seat post 30, thus the back beads may be accommodated in the receiving space 80 so that a removing the back bead process is not required.

Figure 4:
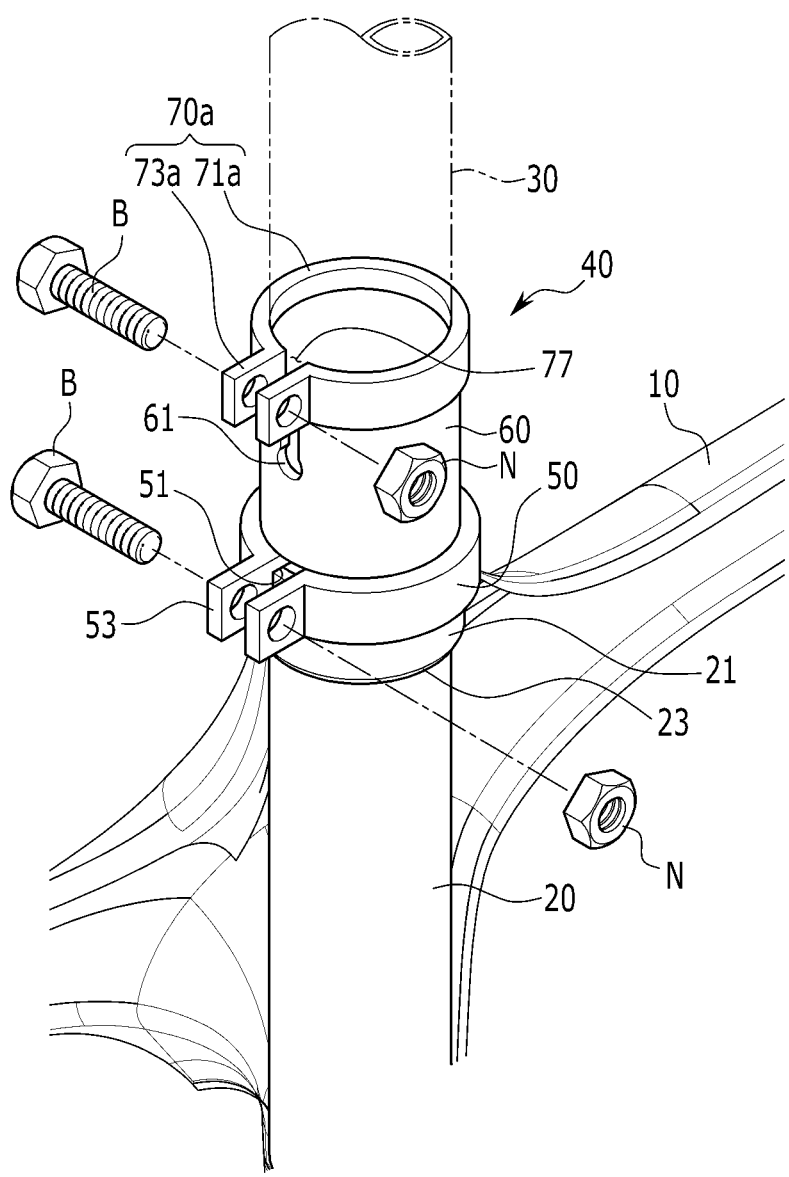
FIG. 4 is a partial perspective view of a bicycle frame in a second exemplary form of the present disclosure.
Figure 5:
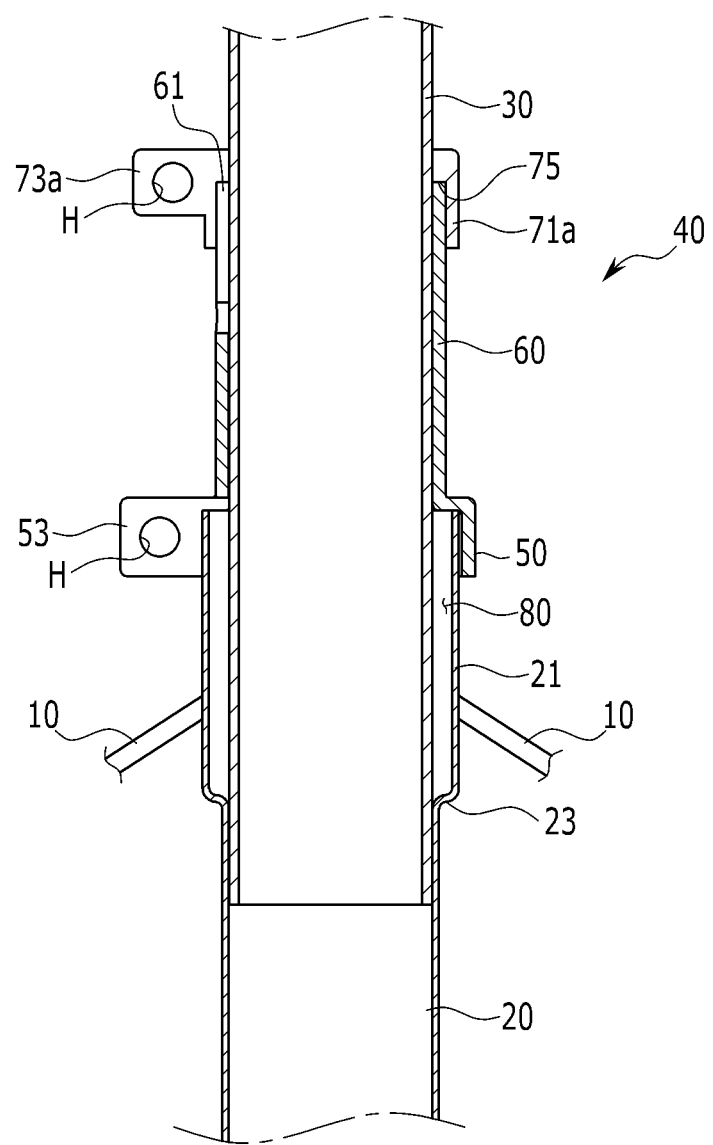
FIG. 5 is a cross-sectional view of a bicycle frame in the second exemplary form of the present disclosure.

FIG. 4 is a partial perspective view of a bicycle frame according to the second exemplary form of the present disclosure, and FIG. 5 is a cross-sectional view of a bicycle frame according to the second exemplary form of the present disclosure.

For easy comprehension, during description of a bicycle frame according to the second exemplary form of the present disclosure as shown in FIG. 4 and FIG. 5, repeated description of the same elements described in FIG. 1 to FIG. 3 will be omitted.

A bicycle frame 1*a* according to the second exemplary form of the present disclosure basically has common elements of the bicycle frame 1 according to the first exemplary form of the present disclosure as shown in FIG. 1 to FIG. 3 except for a second clamp 70*a* separated from the body 60.

The second clamp 70*a* includes a fitting portion 75 supported by an upper end of the body 40.

The second clamp 70*a* further includes an engaging portion 71*a* covering an upper part of the body 60, second protrusions 73*a* bent from both ends of the engaging portion 71*a*, and an opening portion 77 formed between the second protrusions 73*a*.

Referring to FIG. 5, an upper part of the body 60 is inserted into the engaging portion 71*a* of the second clamp 70*a* and is fixed thereto.

The opening portion 77 is formed to a side of engaging portion 71*a*. For example, the engaging portion 71*a* may be formed as "C" shape with the opening portion 77.

The second protrusions 73*a* are bent from both ends of the engaging portion 71*a*. An engage hole H is formed to each of the second protrusions 73*a*.

According to the second exemplary form of the present disclosure, the seat tube 20, the seat post 30 and the adapter tube 40 of the bicycle frame may be connected through the first and the second clamps 50 and 70*a*.

The first clamp 50 integrally formed to the lower part of the adapter tube 40 corresponding to the enlarged portion 21 of the seat tube 20 may fix the seat tube 20 with the adapter tube 40 by fastening the fastening member B/N through the first protrusions 53. The second clamp 70*a* may fix the seat post 30 with the adapter tube 40 by fastening the fastening member B/N through the second protrusions 73*a*.

According to various exemplary forms of the present disclosure the bicycle frame 1, 1*a* has an enlarged portion 21 formed to an upper portion of the seat tube 20 for accommodating back beads formed when the main frame 10 and the seat tube 20 are welded and thus a removing the back bead process is not required.

Also, according to various exemplary forms of the present disclosure the bicycle frame 1, 1a provided with the adapter tube 40 connecting the seat tube 20 and the seat post 30, of which various seat posts 30 may be applied. For example, by adjusting diameters or thicknesses of the adapter tube 40, various seat posts 30 may be connected.

That is, various seat post 30 with various diameters may be applied to the bicycle frame 1, 1*a* with common main frame 10 and the seat tube 20 by changing thickness diameter of the adapter tube 40.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

| <Description of symbols> | |
|---|---|
| 1: bicycle frame | 3: bicycle saddle |
| 10: main frame | 11: first frame |
| 13: second frame | 20: seat tube |
| 21: enlarged portion | 23: stepped surface |
| 30: seat post | 40: adapter tube |
| 50: first clamp | 51: slit |
| 53: first protrusion | 60: body |
| 61: cut off portion | 70, 70a: second clamp |
| 71, 71a: engaging portion | 73, 73a: second protrusion |
| 75: fitting portion | 77: opening portion |
| H: engage hole | B/N: fastening member |
| 80: receiving space | |

What is claimed is:

1. A bicycle frame comprising:
   a seat tube having an enlarged portion formed in an upper part of the seat tube, the enlarged portion connected with a main frame;
   a seat post movably disposed within the seat tube;
   a bicycle saddle mounted to an upper end of the seat post; and
   an adapter tube into which the seat post is inserted,
   wherein the adapter tube comprises:
   a first clamp connected with the enlarged portion,
   a second clamp connected with the seat post, and
   a body connected with the first clamp and the second clamp.

2. The bicycle frame of claim 1, wherein the enlarged portion and the main frame are connected to each other.

3. The bicycle frame of claim 1, wherein the seat post inserted into the adapter tube contacts an interior circumference of the seat tube.

4. The bicycle frame of claim 1, wherein an interior diameter of the first clamp is greater than an exterior diameter of the enlarged portion, and an upper portion of the enlarged portion supports the body via the first clamp.

5. The bicycle frame of claim 4, wherein the first clamp covers an exterior circumference of the enlarged portion, and the first clamp comprises first protrusions bent from corresponding ends of a slit formed in the first clamp.

6. The bicycle frame of claim 4, wherein the body is integrated in an upper portion of the first clamp and supports the seat post.

7. The bicycle frame of claim 6, wherein a cut off portion is formed in the body along a longitudinal direction of the body.

8. The bicycle frame of claim 7, wherein the second clamp comprises second protrusions bent from corresponding ends of the cut off portion.

9. The bicycle frame of claim 8, wherein an engage hole configured to engage with a fastening member is formed to each protrusion of the first protrusions and the second protrusions.

10. The bicycle frame of claim 8, wherein the first clamp, the second clamp and the body are integrally formed.

11. The bicycle frame of claim 7, wherein the second clamp comprises a fitting portion supported by an upper end of the body.

12. The bicycle frame of claim 11, wherein the second clamp further comprises:
   an engaging portion configured to cover an upper part of the body;
   second protrusions bent from corresponding ends of the engaging portion; and
   an opening formed between the second protrusions.

13. The bicycle frame of claim 12, wherein an engage hole configured to engage a fastening member is formed in each protrusion of the first protrusions and the second protrusions.

14. The bicycle frame of claim 12, wherein the first clamp and the body are integrally formed.

15. The bicycle frame of claim 1, wherein a receiving space is formed between the enlarged portion and the seat post.

16. The bicycle frame of claim 1, wherein an exterior diameter of the body is less than an interior diameter of the enlarged portion.

\* \* \* \* \*